(12) United States Patent
Chang et al.

(10) Patent No.: US 8,964,307 B2
(45) Date of Patent: Feb. 24, 2015

(54) IMAGING LENS AND ELECTRONIC DEVICE HAVING THE SAME

(71) Applicant: Genius Electronic Optical Co., Ltd., Taichung (TW)

(72) Inventors: Kuo-Wen Chang, Taichung (TW); Poche Lee, Taichung (TW); Sheng-Wei Hsu, Taichung (TW); Tzu-Chien Tang, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 0 days.

(21) Appl. No.: 13/936,464

(22) Filed: Jul. 8, 2013

(65) Prior Publication Data

US 2014/0253796 A1    Sep. 11, 2014

(30) Foreign Application Priority Data

Mar. 8, 2013   (TW) .............................. 102108256 A

(51) Int. Cl.
| | | |
|---|---|---|
| *G02B 13/18* | (2006.01) | |
| *H04N 5/225* | (2006.01) | |
| *G02B 13/00* | (2006.01) | |
| *G02B 7/02* | (2006.01) | |

(52) U.S. Cl.
CPC .......... *H04N 5/2254* (2013.01); *G02B 13/0045* (2013.01); *G02B 7/021* (2013.01)
USPC .......................................... 359/714; 348/345

(58) Field of Classification Search
CPC ...... G02B 9/60; G02B 13/0045; G02B 13/18; H04N 5/2254
USPC .................................... 348/340; 359/714, 764
See application file for complete search history.

(56) References Cited

U.S. PATENT DOCUMENTS

| | | | |
|---|---|---|---|
| 7,480,105 | B2 | 1/2009 | Mori |
| 7,911,711 | B1 | 3/2011 | Tang et al. |
| 8,467,137 | B2 * | 6/2013 | Yonezawa et al. ............ 359/714 |
| 2010/0033616 | A1 | 2/2010 | Huang et al. |
| 2010/0254029 | A1 | 10/2010 | Shinohara |
| 2011/0176049 | A1 | 7/2011 | Hsieh et al. |
| 2011/0249348 | A1 | 10/2011 | Kubota et al. |
| 2011/0316969 | A1 | 12/2011 | Hsieh et al. |
| 2012/0069455 | A1 | 3/2012 | Lin et al. |
| 2012/0087019 | A1 | 4/2012 | Tang et al. |
| 2012/0087020 | A1 | 4/2012 | Tang et al. |
| 2012/0212660 | A1 | 8/2012 | Tang et al. |
| 2012/0218647 | A1 | 8/2012 | Yonezawa et al. |
| 2012/0250167 | A1 | 10/2012 | Hashimoto |

FOREIGN PATENT DOCUMENTS

| | | | |
|---|---|---|---|
| JP | 2008281760 | A | 11/2008 |
| JP | 2010026434 | A | 2/2010 |
| JP | 2010152042 | A | 7/2010 |
| JP | 2010224521 | A | 10/2010 |
| JP | 4858648 | B2 | 1/2012 |
| JP | 2012208326 | A | 10/2012 |

* cited by examiner

*Primary Examiner* — David N Spector
(74) *Attorney, Agent, or Firm* — Baker & McKenzie LLP

(57) ABSTRACT

An imaging lens includes first, second, third, fourth, and fifth lens elements arranged from an object side to an image side in the given order. Through surface designs of the lens elements, the imaging lens has a relatively short overall length while maintaining good optical performance.

17 Claims, 25 Drawing Sheets system focal length =4.11 mm, half field-of-view =34.85°, F-number =2.40, system length =4.81mm

| lens element | surface | radius of curvature | thickness | refractive index | Abbe number | material | focal length |
|---|---|---|---|---|---|---|---|
| object | | ∞ | 600.000 | | | | |
| aperture stop 2 | | ∞ | -0.242 | | | | |
| first lens element 3 | object-side surface 31 | 1.483 | 0.629 | 1.546 | 56.114 | plastic | 2.360 |
| | image-side surface 32 | -8.357 | 0.050 | | | | |
| second lens element 4 | object-side surface 41 | 18.697 | 0.312 | 1.645 | 23.528 | plastic | -3.581 |
| | image-side surface 42 | 2.041 | 0.479 | | | | |
| third lens element 5 | object-side surface 51 | -5.961 | 0.328 | 1.645 | 23.528 | plastic | 190.665 |
| | image-side surface 52 | -5.808 | 0.343 | | | | |
| fourth lens element 6 | object-side surface 61 | -1.901 | 0.557 | 1.546 | 56.114 | plastic | 3.353 |
| | image-side surface 62 | -1.029 | 0.284 | | | | |
| fifth lens element 7 | object-side surface 71 | 4.777 | 0.443 | 1.546 | 56.114 | plastic | -3.098 |
| | image-side surface 72 | 1.208 | 0.467 | | | | |
| optical filter 8 | object-side surface 81 | ∞ | 0.300 | | | | |
| | image-side surface 82 | ∞ | 0.631 | | | | |
| image plane 9 | | ∞ | -0.009 | | | | |

FIG. 3

| surface | 31 | 32 | 41 | 42 | 51 |
|---|---|---|---|---|---|
| NRADIUS | 9.334E-01 | 9.656E-01 | 9.503E-01 | 9.215E-01 | 9.445E-01 |
| K | -4.494E+00 | 0.000E+00 | 0.000E+00 | -9.806E+00 | 0.000E+00 |
| a0 | 9.336E-02 | 1.187E-03 | 1.287E-02 | 1.026E-01 | -1.199E-01 |
| a1 | -7.635E-03 | -1.540E-02 | -2.054E-03 | 1.080E-02 | 5.748E-03 |
| a2 | -9.218E-04 | -2.093E-03 | -1.360E-04 | 2.839E-03 | 4.368E-04 |
| a3 | -4.560E-04 | -1.480E-04 | 4.651E-04 | 6.556E-04 | 2.421E-05 |
| a4 | -6.247E-05 | 0.000E+00 | 4.644E-05 | 9.543E-05 | 0.000E+00 |
| surface | 52 | 61 | 62 | 71 | 72 |
| NRADIUS | 1.112E+00 | 1.166E+00 | 1.408E+00 | 1.930E+00 | 2.394E+00 |
| K | 0.000E+00 | -1.886E+00 | -7.215E-01 | -3.851E+01 | -6.686E+00 |
| a0 | -9.579E-02 | 5.062E-02 | 5.391E-01 | -5.459E-01 | -1.241E+00 |
| a1 | 2.212E-02 | 1.098E-02 | 8.494E-03 | 1.454E-01 | 1.692E-01 |
| a2 | 0.000E+00 | -3.389E-03 | 4.918E-04 | -2.102E-02 | -1.789E-02 |
| a3 | 0.000E+00 | -7.209E-04 | -4.068E-03 | 3.699E-03 | 1.582E-02 |
| a4 | 0.000E+00 | 3.160E-04 | 7.994E-04 | -1.809E-03 | -5.525E-03 |
| a5 | 0.000E+00 | -8.975E-05 | -2.181E-04 | 5.533E-04 | -2.906E-04 |
| a6 | 0.000E+00 | 0.000E+00 | 0.000E+00 | -7.052E-05 | -1.375E-03 |
| a7 | 0.000E+00 | 0.000E+00 | 0.000E+00 | 0.000E+00 | -2.898E-04 |

FIG. 5

FIG. 8 system focal length =4.11 mm, half field-of-view =34.84°, F-number =2.40, system length =4.91mm

| lens element | surface | radius of curvature | thickness | refractive index | Abbe number | material | focal length |
|---|---|---|---|---|---|---|---|
| object | | ∞ | 600.000 | | | | |
| aperture stop 2 | | ∞ | -0.242 | | | | |
| first lens element 3 | object-side surface 31 | 1.493 | 0.702 | 1.546 | 56.114 | plastic | 2.429 |
| | image-side surface 32 | -9.898 | 0.050 | | | | |
| second lens element 4 | object-side surface 41 | 12.841 | 0.220 | 1.645 | 23.528 | plastic | -3.997 |
| | image-side surface 42 | 2.131 | 0.491 | | | | |
| third lens element 5 | object-side surface 51 | -7.440 | 0.435 | 1.645 | 23.528 | plastic | -118.973 |
| | image-side surface 52 | -8.428 | 0.223 | | | | |
| fourth lens element 6 | object-side surface 61 | -2.058 | 0.641 | 1.546 | 56.114 | plastic | 3.357 |
| | image-side surface 62 | -1.076 | 0.306 | | | | |
| fifth lens element 7 | object-side surface 71 | 4.741 | 0.447 | 1.546 | 56.114 | plastic | -3.134 |
| | image-side surface 72 | 1.215 | 0.467 | | | | |
| optical filter 8 | object-side surface 81 | ∞ | 0.300 | | | | |
| | image-side surface 82 | ∞ | 0.635 | | | | |
| image plane 9 | | ∞ | -0.007 | | | | |

| surface | 31 | 32 | 41 | 42 | 51 |
|---|---|---|---|---|---|
| NRADIUS | 9.334E-01 | 9.656E-01 | 9.503E-01 | 9.215E-01 | 9.492E-01 |
| K | -4.484E+00 | 0.000E+00 | 0.000E+00 | -1.084E+01 | 0.000E+00 |
| a0 | 9.411E-02 | -8.846E-05 | 1.234E-02 | 9.982E-02 | -1.196E-01 |
| a1 | -6.268E-03 | -1.500E-02 | -2.584E-03 | 1.160E-02 | 4.022E-03 |
| a2 | -4.150E-04 | -1.592E-03 | -8.674E-04 | 2.562E-03 | 1.230E-03 |
| a3 | -2.950E-04 | -1.941E-04 | 1.590E-04 | 5.677E-04 | 2.581E-04 |
| a4 | -3.326E-05 | 0.000E+00 | -1.827E-05 | 6.371E-05 | 0.000E+00 |

| surface | 52 | 61 | 62 | 71 | 72 |
|---|---|---|---|---|---|
| NRADIUS | 1.112E+00 | 1.166E+00 | 1.408E+00 | 1.930E+00 | 2.394E+00 |
| K | 0.000E+00 | -2.071E+00 | -7.093E-01 | -3.851E+01 | -6.192E+00 |
| a0 | -9.807E-02 | 5.786E-02 | 5.177E-01 | -5.187E-01 | -1.106E+00 |
| a1 | 1.782E-02 | 1.359E-02 | 9.626E-03 | 1.448E-01 | 1.756E-01 |
| a2 | 0.000E+00 | -4.628E-03 | -1.455E-03 | -2.091E-02 | -1.867E-02 |
| a3 | 0.000E+00 | -6.508E-04 | -3.341E-03 | 3.691E-03 | 1.586E-02 |
| a4 | 0.000E+00 | 3.210E-04 | 7.261E-04 | -1.823E-03 | -5.161E-03 |
| a5 | 0.000E+00 | -9.298E-05 | -1.498E-04 | 5.494E-04 | 1.533E-04 |
| a6 | 0.000E+00 | 0.000E+00 | 0.000E+00 | -6.743E-05 | -1.082E-03 |
| a7 | 0.000E+00 | 0.000E+00 | 0.000E+00 | 0.000E+00 | -1.386E-04 |

FIG. 9 system focal length =4.12mm, half field-of-view =34.87°, F-number =2.40, system length =4.83mm

| lens element | surface | radius of curvature | thickness | refractive index | Abbe number | material | focal length |
|---|---|---|---|---|---|---|---|
| object | | ∞ | 600.000 | | | | |
| aperture stop 2 | | ∞ | -0.242 | | | | |
| first lens element 3 | object-side surface 31 | 1.487 | 0.706 | 1.546 | 56.114 | plastic | 2.380 |
| | image-side surface 32 | -8.567 | 0.051 | | | | |
| second lens element 4 | object-side surface 41 | 16.439 | 0.220 | 1.645 | 23.528 | plastic | -3.747 |
| | image-side surface 42 | 2.095 | 0.469 | | | | |
| third lens element 5 | object-side surface 51 | -4.770 | 0.377 | 1.645 | 23.528 | plastic | 214.613 |
| | image-side surface 52 | -4.754 | 0.333 | | | | |
| fourth lens element 6 | object-side surface 61 | -1.950 | 0.550 | 1.546 | 56.114 | plastic | 3.494 |
| | image-side surface 62 | -1.060 | 0.406 | | | | |
| fifth lens element 7 | object-side surface 71 | 5.423 | 0.380 | 1.546 | 56.114 | plastic | -3.063 |
| | image-side surface 72 | 1.247 | 0.467 | | | | |
| optical filter 8 | object-side surface 81 | ∞ | 0.300 | | | | |
| | image-side surface 82 | ∞ | 0.577 | | | | |
| image plane 9 | | ∞ | -0.007 | | | | |

FIG. 12

| surface | 31 | 32 | 41 | 42 | 51 |
|---|---|---|---|---|---|
| NRADIUS | 9.334E-01 | 9.656E-01 | 9.503E-01 | 9.215E-01 | 9.413E-01 |
| K | -4.454E+00 | 0.000E+00 | 0.000E+00 | -1.052E-01 | 0.000E+00 |
| a0 | 9.431E-02 | 8.253E-04 | 1.303E-02 | 1.010E-01 | -1.212E-01 |
| a1 | -6.449E-03 | -1.539E-02 | -2.363E-03 | 1.240E-02 | 5.769E-03 |
| a2 | -4.818E-04 | -1.641E-03 | -1.057E-03 | 2.460E-03 | 8.456E-04 |
| a3 | -3.101E-04 | -3.983E-05 | 3.680E-04 | 6.681E-04 | 1.414E-04 |
| a4 | -3.580E-05 | 0.000E+00 | -3.245E-05 | 5.761E-05 | 0.000E+00 |

| surface | 52 | 61 | 62 | 71 | 72 |
|---|---|---|---|---|---|
| NRADIUS | 1.112E+00 | 1.166E+00 | 1.408E+00 | 1.930E+00 | 2.394E+00 |
| K | 0.000E+00 | -1.906E+00 | -7.140E-01 | -3.851E+01 | -6.237E+00 |
| a0 | -9.650E-02 | 5.249E-02 | 5.265E-01 | -5.422E-01 | -1.133E+00 |
| a1 | 1.969E-02 | 1.212E-02 | 1.038E-01 | 1.455E-01 | 1.762E-01 |
| a2 | 0.000E+00 | -3.738E-03 | -1.431E-03 | -2.082E-02 | -2.144E-02 |
| a3 | 0.000E+00 | -7.025E-04 | -3.880E-03 | 3.680E-03 | 1.468E-02 |
| a4 | 0.000E+00 | 2.893E-04 | 7.340E-04 | -1.821E-03 | -5.724E-03 |
| a5 | 0.000E+00 | -7.956E-05 | -1.410E-04 | 5.523E-04 | 4.193E-04 |
| a6 | 0.000E+00 | 0.000E+00 | 0.000E+00 | -6.778E-05 | -9.572E-04 |
| a7 | 0.000E+00 | 0.000E+00 | 0.000E+00 | 0.000E+00 | -6.166E-05 |

FIG. 13

| system focal length =4.12mm, half field-of-view =34.88°, F-number =2.40, system length =4.77mm | | | | | | |
|---|---|---|---|---|---|---|
| lens element | surface | radius of curvature | thickness | refractive index | Abbe number | material | focal length |
| object | | ∞ | 600.000 | | | | |
| aperture stop 2 | | ∞ | -0.243 | | | | |
| first lens element 3 | object-side surface 31 | 1.481 | 0.653 | 1.546 | 56.114 | plastic | 2.350 |
| | image-side surface 32 | -8.083 | 0.067 | | | | |
| second lens element 4 | object-side surface 41 | 20.567 | 0.220 | 1.645 | 23.528 | plastic | -3.510 |
| | image-side surface 42 | 2.030 | 0.485 | | | | |
| third lens element 5 | object-side surface 51 | -3.965 | 0.307 | 1.645 | 23.528 | plastic | 28.870 |
| | image-side surface 52 | -3.368 | 0.483 | | | | |
| fourth lens element 6 | object-side surface 61 | -1.766 | 0.485 | 1.546 | 56.114 | plastic | 3.665 |
| | image-side surface 62 | -1.029 | 0.349 | | | | |
| fifth lens element 7 | object-side surface 71 | 5.395 | 0.430 | 1.546 | 56.114 | plastic | -2.983 |
| | image-side surface 72 | 1.216 | 0.467 | | | | |
| optical filter 8 | object-side surface 81 | ∞ | 0.300 | | | | |
| | image-side surface 82 | ∞ | 0.538 | | | | |
| image plane 9 | | ∞ | -0.009 | | | | |

FIG. 16

| surface | 31 | 32 | 41 | 42 | 51 |
|---|---|---|---|---|---|
| NRADIUS | 9.334E-01 | 9.656E-01 | 9.503E-01 | 9.215E-01 | 9.428E-01 |
| K | -4.426E+00 | 0.000E+00 | 0.000E+00 | -9.900E+00 | 0.000E+00 |
| a0 | 9.425E-02 | 2.343E-03 | 1.286E-02 | 1.029E-01 | -1.193E-01 |
| a1 | -7.178E-03 | -1.528E-02 | -1.053E-03 | 1.202E-02 | 6.946E-03 |
| a2 | -8.030E-04 | -2.042E-03 | -7.961E-04 | 2.287E-03 | 5.122E-04 |
| a3 | -4.123E-04 | -1.716E-04 | 4.187E-04 | 6.009E-04 | 3.672E-05 |
| a4 | -5.799E-05 | 0.000E+00 | -7.275E-06 | 3.515E-05 | 0.000E+00 |
| surface | 52 | 61 | 62 | 71 | 72 |
| NRADIUS | 1.112E+00 | 1.166E+00 | 1.408E+00 | 1.930E+00 | 2.394E+00 |
| K | 0.000E+00 | -1.748E+00 | -7.229E-01 | -3.851E+01 | -6.512E+00 |
| a0 | -9.749E-02 | 4.630E-02 | 5.367E-01 | -5.560E-01 | -1.160E+00 |
| a1 | 2.068E-02 | 9.932E-03 | 1.005E-02 | 1.460E-01 | 1.543E-01 |
| a2 | 0.000E+00 | -2.850E-03 | 4.743E-04 | -2.091E-02 | -2.062E-02 |
| a3 | 0.000E+00 | -8.634E-04 | -4.004E-03 | 3.658E-03 | 1.415E-02 |
| a4 | 0.000E+00 | 3.383E-04 | 1.053E-03 | -1.823E-03 | -4.702E-03 |
| a5 | 0.000E+00 | -7.172E-05 | -1.902E-04 | 5.547E-04 | 6.361E-04 |
| a6 | 0.000E+00 | 0.000E+00 | 0.000E+00 | -6.729E-05 | -8.215E-04 |
| a7 | 0.000E+00 | 0.000E+00 | 0.000E+00 | 0.000E+00 | -1.079E-04 |

FIG. 17

FIG. 20 system focal length =4.12mm, half field-of-view =34.87°, F-number =2.40, system length =4.82mm

| lens element | surface | radius of curvature | thickness | refractive index | Abbe number | material | focal length |
|---|---|---|---|---|---|---|---|
| object | | ∞ | 600.000 | | | | |
| aperture stop 2 | | ∞ | -0.243 | | | | |
| first lens element 3 | object-side surface 31 | 1.479 | 0.689 | 1.546 | 56.114 | plastic | 2.343 |
| | image-side surface 32 | -7.893 | 0.051 | | | | |
| second lens element 4 | object-side surface 41 | 18.811 | 0.220 | 1.645 | 23.528 | plastic | -3.596 |
| | image-side surface 42 | 2.054 | 0.475 | | | | |
| third lens element 5 | object-side surface 51 | -9.594 | 0.331 | 1.645 | 23.528 | plastic | 55.166 |
| | image-side surface 52 | -7.658 | 0.299 | | | | |
| fourth lens element 6 | object-side surface 61 | -1.752 | 0.598 | 1.546 | 56.114 | plastic | 3.491 |
| | image-side surface 62 | -1.023 | 0.285 | | | | |
| fifth lens element 7 | object-side surface 71 | 4.524 | 0.435 | 1.546 | 56.114 | plastic | -3.141 |
| | image-side surface 72 | 1.201 | 0.467 | | | | |
| optical filter 8 | object-side surface 81 | ∞ | 0.300 | | | | |
| | image-side surface 82 | ∞ | 0.679 | | | | |
| image plane 9 | | ∞ | -0.008 | | | | |

| surface | 31 | 32 | 41 | 42 | 51 |
|---|---|---|---|---|---|
| NRADIUS | 9.334E-01 | 9.656E-01 | 9.503E-01 | 9.215E-01 | 9.523E-01 |
| K | -4.482E+00 | 0.000E+00 | 0.000E+00 | -9.758E+00 | 0.000E+00 |
| a0 | 9.360E-02 | 1.212E-04 | 1.391E-02 | 1.035E-01 | -1.160E-01 |
| a1 | -7.344E-03 | -1.636E-02 | -2.502E-03 | 1.206E-02 | 6.758E-03 |
| a2 | -7.331E-04 | -1.213E-03 | -3.246E-05 | 2.496E-03 | 5.338E-04 |
| a3 | -3.855E-04 | 1.093E-04 | 7.009E-04 | 7.673E-04 | 9.462E-05 |
| a4 | -4.604E-05 | 0.000E+00 | -1.568E-05 | 5.490E-05 | 0.000E+00 |

| surface | 52 | 61 | 62 | 71 | 72 |
|---|---|---|---|---|---|
| NRADIUS | 1.112E+00 | 1.166E+00 | 1.408E+00 | 1.930E+00 | 2.394E+00 |
| K | 0.000E+00 | -1.735E+00 | -7.267E-01 | -3.851E+01 | -6.585E+00 |
| a0 | -1.021E-01 | 4.701E-02 | 5.473E-01 | -5.558E-01 | -1.258E+00 |
| a1 | 2.243E-02 | 1.118E-02 | 7.425E-03 | 1.456E-01 | 1.667E-01 |
| a2 | 0.000E+00 | -3.915E-03 | 1.138E-03 | -2.113E-02 | -2.634E-02 |
| a3 | 0.000E+00 | -7.403E-04 | -3.559E-03 | 3.642E-03 | 1.562E-02 |
| a4 | 0.000E+00 | 3.358E-04 | 8.039E-04 | -1.819E-03 | -6.098E-03 |
| a5 | 0.000E+00 | -1.042E-04 | -2.593E-04 | 5.475E-04 | -3.353E-05 |
| a6 | 0.000E+00 | 0.000E+00 | 0.000E+00 | -7.123E-05 | -1.398E-03 |
| a7 | 0.000E+00 | 0.000E+00 | 0.000E+00 | 0.000E+00 | -1.697E-04 |

FIG. 21

| relationship | first preferred embodiment | second preferred embodiment | third preferred embodiment | fourth preferred embodiment | fifth preferred embodiment |
|---|---|---|---|---|---|
| T2 | 0.31 | 0.22 | 0.22 | 0.22 | 0.22 |
| T4 | 0.56 | 0.64 | 0.55 | 0.48 | 0.60 |
| T5 | 0.44 | 0.45 | 0.38 | 0.43 | 0.44 |
| G23 | 0.48 | 0.49 | 0.47 | 0.48 | 0.48 |
| G34 | 0.34 | 0.22 | 0.33 | 0.48 | 0.30 |
| G45 | 0.28 | 0.31 | 0.41 | 0.35 | 0.28 |
| Gaa | 1.16 | 1.07 | 1.26 | 1.38 | 1.11 |
| ALT | 2.27 | 2.44 | 2.23 | 2.09 | 2.27 |
| TTL | 4.81 | 4.91 | 4.83 | 4.77 | 4.82 |
| ALT/T4 | 4.08 | 3.82 | 4.06 | 4.32 | 3.80 |
| ALT/Gaa | 1.96 | 2.28 | 1.77 | 1.51 | 2.05 |
| ALT/G45 | 7.99 | 7.99 | 5.50 | 6.00 | 7.99 |
| G34/G45 | 1.21 | 0.73 | 0.82 | 1.39 | 1.05 |
| T4/T5 | 1.26 | 1.43 | 1.45 | 1.13 | 1.37 |
| TTL/ALT | 2.12 | 2.01 | 2.16 | 2.28 | 2.12 |
| TTL/Gaa | 4.17 | 4.59 | 3.84 | 3.45 | 4.35 |
| G45/T2 | 0.91 | 1.39 | 1.84 | 1.59 | 1.29 |
| T4/G34 | 1.62 | 2.87 | 1.65 | 1.00 | 2.00 |
| Gaa/T5 | 2.61 | 2.40 | 3.32 | 3.22 | 2.55 |
| T4/T2 | 1.78 | 2.91 | 2.50 | 2.20 | 2.72 |

IMAGING LENS AND ELECTRONIC DEVICE HAVING THE SAME

CROSS-REFERENCE TO RELATED APPLICATION

This application claims priority of Taiwanese Application No. 102108256, filed on Mar. 8, 2013.

BACKGROUND OF THE INVENTION

1. Field of the Invention

The present invention relates to an imaging lens, and an electronic device including the same.

2. Description of the Related Art

In recent years, as use of portable electronic devices (e.g., mobile phones and digital cameras) becomes ubiquitous, much effort has been put into reducing dimensions of portable electronic devices. As dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

In view of the above, each of U.S. Patent Application Publication Nos. 20110176049 and 20110316969, and U.S. Pat. No. 7,480,105 discloses a conventional imaging lens with five lens elements, of which the first lens element has a negative refractive power.

Each of U.S. Patent Application Publication Nos. 20120212660, 20100254029, and 20120250167 and Japanese Patent Publication Nos. 2008-281760 and 2012-208326 discloses a conventional imaging lens with five lens elements, of which the fifth lens element has a relatively large thickness and hence is unsuitable for use in electronic devices with smaller dimensions.

U.S. Patent Application Publication Nos. 20120069455, 20120087019, and 20120087020 and Japanese Patent Publication Nos. 2010-224521, 2010-152042, and 2010-026434 discloses a conventional imaging lens with five lens elements, a sum of widths of clearances among which is undesirably large.

Thus, the above conventional imaging lenses are unsuitable for use in certain miniaturized electronic apparatuses due to their longer system lengths. For example, the conventional imaging lens disclosed in Japanese Patent Publication No. 2008-281760 has a system length longer than 16 mm, which may be unfavorable for reduction of dimensions of such as mobile phones and digital cameras.

SUMMARY OF THE INVENTION

Therefore, an object of the present invention is to provide an imaging lens having a relatively short system length while maintaining good optical performance.

Accordingly, an imaging lens of the present invention includes an aperture stop, a first lens element, a second lens element, a third lens element, a fourth lens element, and a fifth lens element arranged along an optical axis from an object side to an image side in the given order. Each of the first, second, third, fourth and fifth lens elements has an object-side surface facing toward the object side and an image-side surface facing toward the image side.

The first lens element has a positive refractive power, and the image-side surface of the first lens element has a convex portion in a vicinity of the optical axis.

The second lens element has a negative refractive power, and the object-side surface of the second lens element has a convex portion in a vicinity of a periphery of the second lens element. The image-side surface of the second lens element has a concave portion in a vicinity of the optical axis.

The object-side surface of the third lens element has a concave portion in a vicinity of a periphery of the third lens element. The image-side surface of the third lens element has a convex portion in a vicinity of the periphery of the third lens element.

The object-side surface of the fourth lens element has a concave portion in a vicinity of the optical axis. The image-side surface of the fourth lens element has a convex portion in a vicinity of the optical axis.

The object-side surface of the fifth lens element has a convex portion in a vicinity of the optical axis. The image-side surface of the fifth lens element has a concave portion in a vicinity of the optical axis and a convex portion in a vicinity of a periphery of the fifth lens element.

The imaging lens of the present invention does not include any lens element with refractive power other than the first, second, third, fourth, and fifth lens elements.

Another object of the present invention is to provide an electronic device having an imaging lens with five lens elements.

Accordingly, an electronic device of the present invention includes a housing and an image module. The image module is disposed in the housing and includes the imaging lens of the present invention, a barrel whereat the imaging lens is disposed, a holder unit on which the barrel is disposed, and an image sensor disposed at the image side with respect to the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 is a table showing values of some optical parameters corresponding to the imaging lens of the first preferred embodiment;

FIG. 5 shows values of some parameters of an optical relationship corresponding to the imaging lens of the first preferred embodiment;

FIG. 8 is a table showing values of some optical parameters corresponding to the imaging lens of the second preferred embodiment;

FIG. 9 shows values of some parameters of the optical relationship corresponding to the imaging lens of the second preferred embodiment;

FIG. 12 is a table showing values of some optical parameters corresponding to the imaging lens of the third preferred embodiment;

FIG. 13 shows values of some parameters of the optical relationship corresponding to the imaging lens of the third preferred embodiment;

FIG. 16 is a table showing values of some optical parameters corresponding to the imaging lens of the fourth preferred embodiment;

FIG. 17 shows values of some parameters of the optical relationship corresponding to the imaging lens of the fourth preferred embodiment;

FIG. 20 is a table showing values of some optical parameters corresponding to the imaging lens of the fifth preferred embodiment;

FIG. 21 shows values of some parameters of the optical relationship corresponding to the imaging lens of the fifth preferred embodiment;

FIG. 23 is a table that shows values of parameters of other optical relationships corresponding to the imaging lenses of the first, second, third, fourth, and fifth preferred embodiments;

DETAILED DESCRIPTION OF THE PREFERRED EMBODIMENTS

Figure 1:
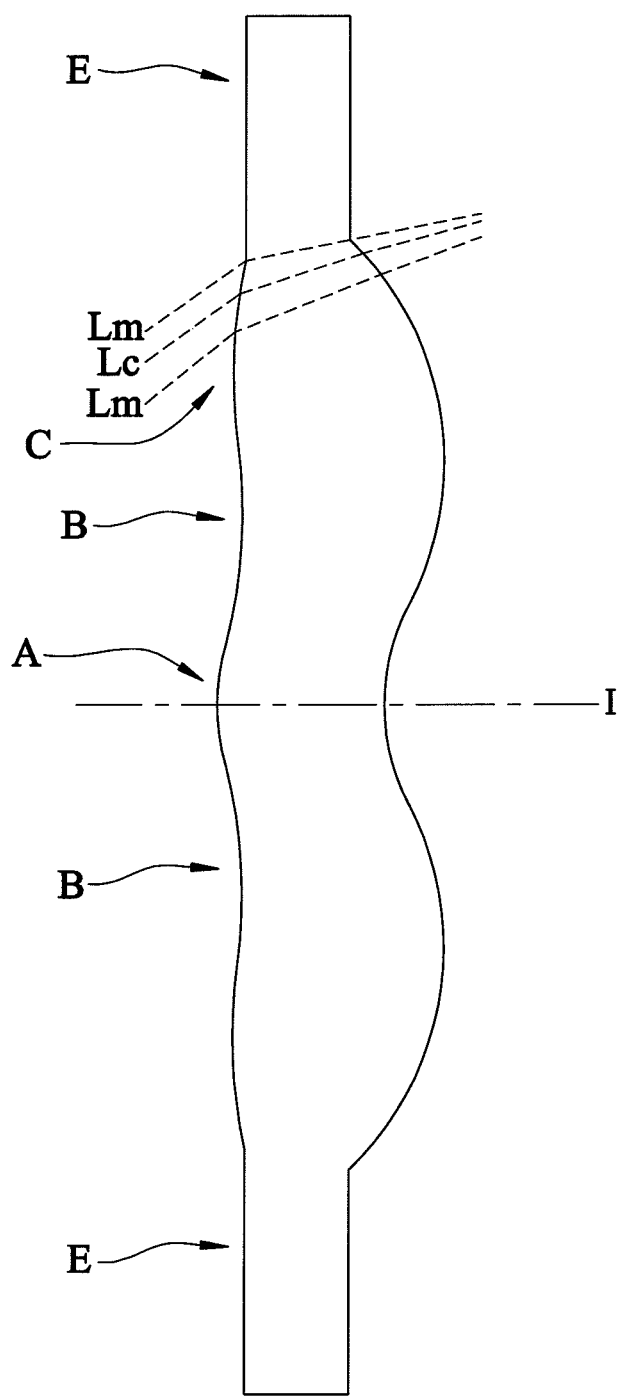
FIG. 1 is a schematic diagram that illustrates different portions of a surface of a lens element according to the present invention.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
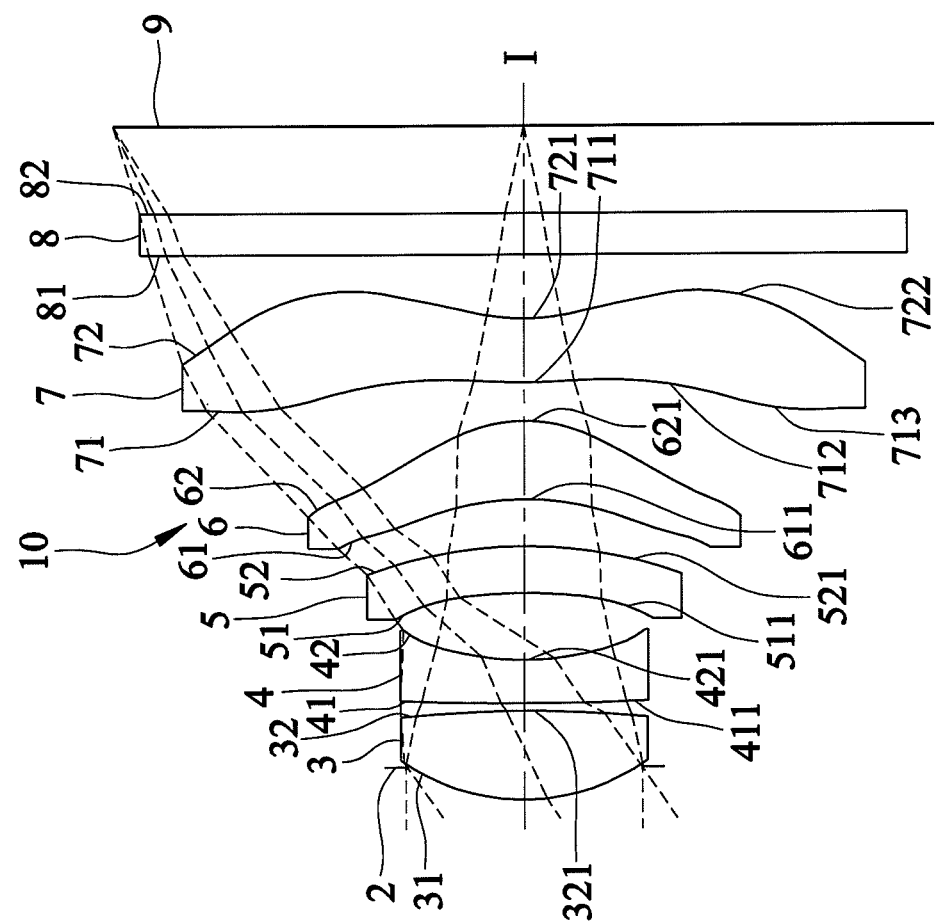
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, first, second, third, fourth and fifth lens elements 3-7, and an optical filter 8 arranged in the given order along an optical axis (I) from an object side to an image side. The optical filter 8 is an infrared cut filter for selectively absorbing infrared light to thereby reduce imperfection of images formed at an image plane 9.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of them may be made of other materials in other embodiments.

In the first preferred embodiment, which is depicted in FIG. 2, the first lens element 3 has a positive refractive power. The object-side surface 31 is a convex surface. The image-side surface 32 is a convex surface, and has a convex portion 321 in a vicinity of the optical axis (I).

The second lens element 4 has a negative refractive power. The object-side surface 41 is a convex surface that has a convex portion 411 in a vicinity of a periphery of the second lens element 4. The image-side surface 42 is a concave surface that has a concave portion 421 in a vicinity of the optical axis (I).

The third lens element 5 has a positive refractive power. The object-side surface 51 is a concave surface that has a concave portion 511 in a vicinity of a periphery of the third lens element 5. The image-side surface 52 is a convex surface that has a convex portion 521 in a vicinity of the periphery of the third lens element 5.

The fourth lens element 6 has a positive refractive power. The object-side surface 61 is a concave surface that has a concave portion 611 in a vicinity of the optical axis (I). The image-side surface 62 is a convex surface that has a convex portion 621 in a vicinity of the optical axis (I).

The fifth lens element 7 has a negative refractive power. The object-side surface 71 has a first convex portion 711 in a vicinity of the optical axis (I), a second convex portion 713 in a vicinity of a periphery of the fifth lens element 7, and a concave portion 712 between the first and second convex portions 711, 713. The image-side surface 72 has a concave portion 721 in a vicinity of the optical axis (I), and a convex portion 722 in a vicinity of a periphery of the fifth lens element 7.

Shown in FIG. 3 is a table that lists values of some optical parameters corresponding to the surfaces 31-81, 32-82 of the first preferred embodiment. In the first preferred embodiment, the imaging lens 10 has an effective focal length (EFL) of 4.11 mm, a half field of view (HFOV) of 34.85°, an f-number of 2.40, and a system length (i.e., the length from the object-side surface 31 to the image plane 9 at the optical axis (I)) of 4.81 mm.

Figure 4:
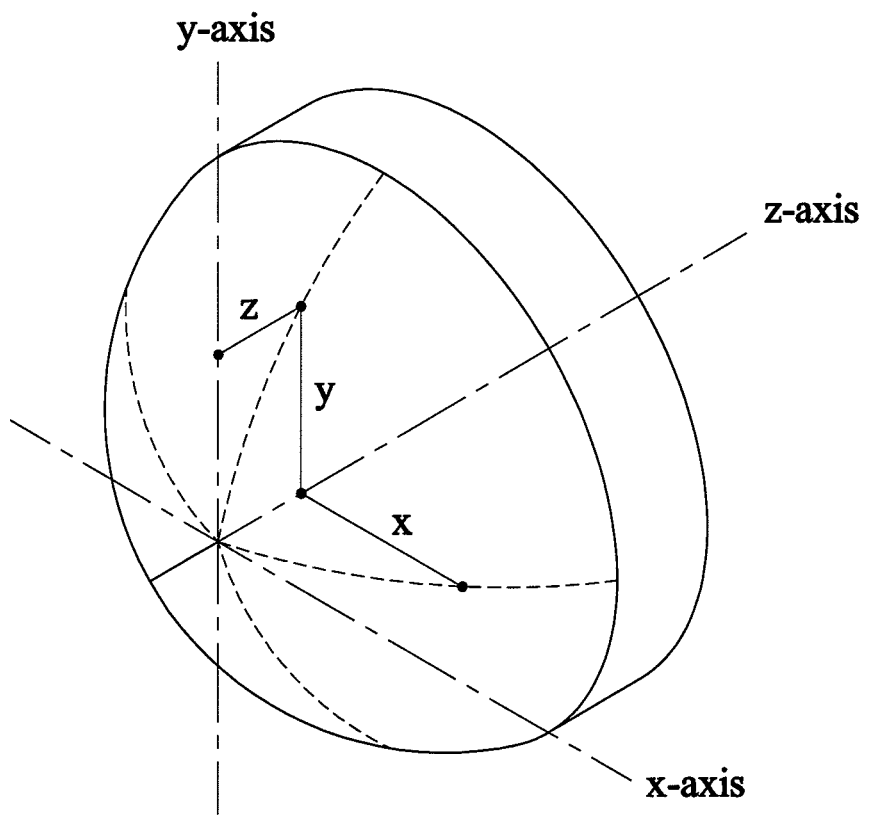
FIG. 4 is a diagram to show a lens element in a Cartesian coordinate system with "x", "y", and "z" axes.

Each of the object-side surfaces 31-71 and the image-side surfaces 32-72 is an aspherical surface satisfying the optical relationship of $$Z = \frac{cr^2}{1+\sqrt{1-(1+K)c^2r^2}} + u^4 \sum_{m=0}^{13} a_m Q_m^{con}(u^2) \qquad (1)$$

where:

"Z" represents a depth of the aspherical surface (i.e., a distance from a tangential plane, which is tangent to a point of the aspherical surface intersecting with the optical axis (I), to an arbitrary point at the aspherical surface);

"c" represents a vertex curvature of the aspherical surface;

"K" represents a conic constant of the aspherical surface;

"r" represents a radial distance of the aspherical surface, and is equal to a result of square root of a sum of square of "x" and square of "y" (i.e., $r=(x^2-y^2)$;

"$r_n$" represents a normalization radius (NRADIUS);

"u" is a result of division of "r" by "$r_n$";

"$a_m$" represents an m-th order coefficient;

"$Q_m^{con}$" represents an m-th order polynomial;

"x" and "y" represent respectively axes perpendicular to each other, as shown in FIG. 4; and "z" is an axis perpendicular to the axes of "x" and "y" and coinciding with the optical axis (I).

FIG. 5 shows a table showing values of some parameters of optical relationship 1 corresponding to the first preferred embodiment. The imaging lens 10 of the first preferred embodiment satisfies:

ALT/T4=4.08;

ALT/Gaa=1.96;

ALT/G45=7.99;

G34/G45=1.21;

T4/T5=1.26;

TTL/ALT=2.12;

TTL/Gaa=4.17;

G45/T2=0.91;

T4/G34=1.62;

Gaa/T5=2.61; and

T4/T2=1.78, where:

"T2" represents a distance between the object-side surface 41 and the image-side surface 42 of the second lens element 4 at the optical axis (I) (i.e., a thickness of the second lens element 4 at the optical axis (I));

"T4" represents a distance between the object-side surface 61 and the image-side surface 62 of the fourth lens element 6 at the optical axis (I) (i.e., a thickness of the fourth lens element 6 at the optical axis (I));

"T5" represents a distance between the object-side surface 71 and the image-side surface 72 of the fifth lens element 7 at the optical axis (I) (i.e., a thickness of the fifth lens element 7 at the optical axis (I));

"Gaa" represents a sum of widths of a clearance between the first and second lens elements 3, 4 at the optical axis (I), a clearance between the second and third lens elements 4, 5 at the optical axis (I), a clearance between the third and fourth lens elements 5, 6 at the optical axis (I), and a clearance between the fourth and fifth lens elements 6, 7 at the optical axis (I);

"G34" represents the width of the clearance between the third and fourth lens elements 5, 6 at the optical axis (I);

"G45" represents the width of the clearance between the fourth and fifth lens elements 6, 7 at the optical axis (I);

"ALT" represents a sum of a distance between the object-side surface 31 and the image-side surface 32 of the first lens element 3 at the optical axis (I), the distance between the object-side surface 41 and the image-side surface 42 of the second lens element 4 at the optical axis (I), a distance between, the object-side surface 51 and the image-side surface 52 of the third lens element 5 at the optical axis (I), the distance between the object-side surface 61 and the image-side surface 62 of the fourth lens element 6 at the optical axis (I), and the distance between the object-side surface 71 and the image-side surface 72 of the fifth lens element 7 at the optical axis (I); and "TTL" represents a distance between the object-side surface 31 of the first lens element 3 and the image plane 9.

FIGS. 6(a) to 6(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 588 nm, and 650 nm are shown.

Figure 6:
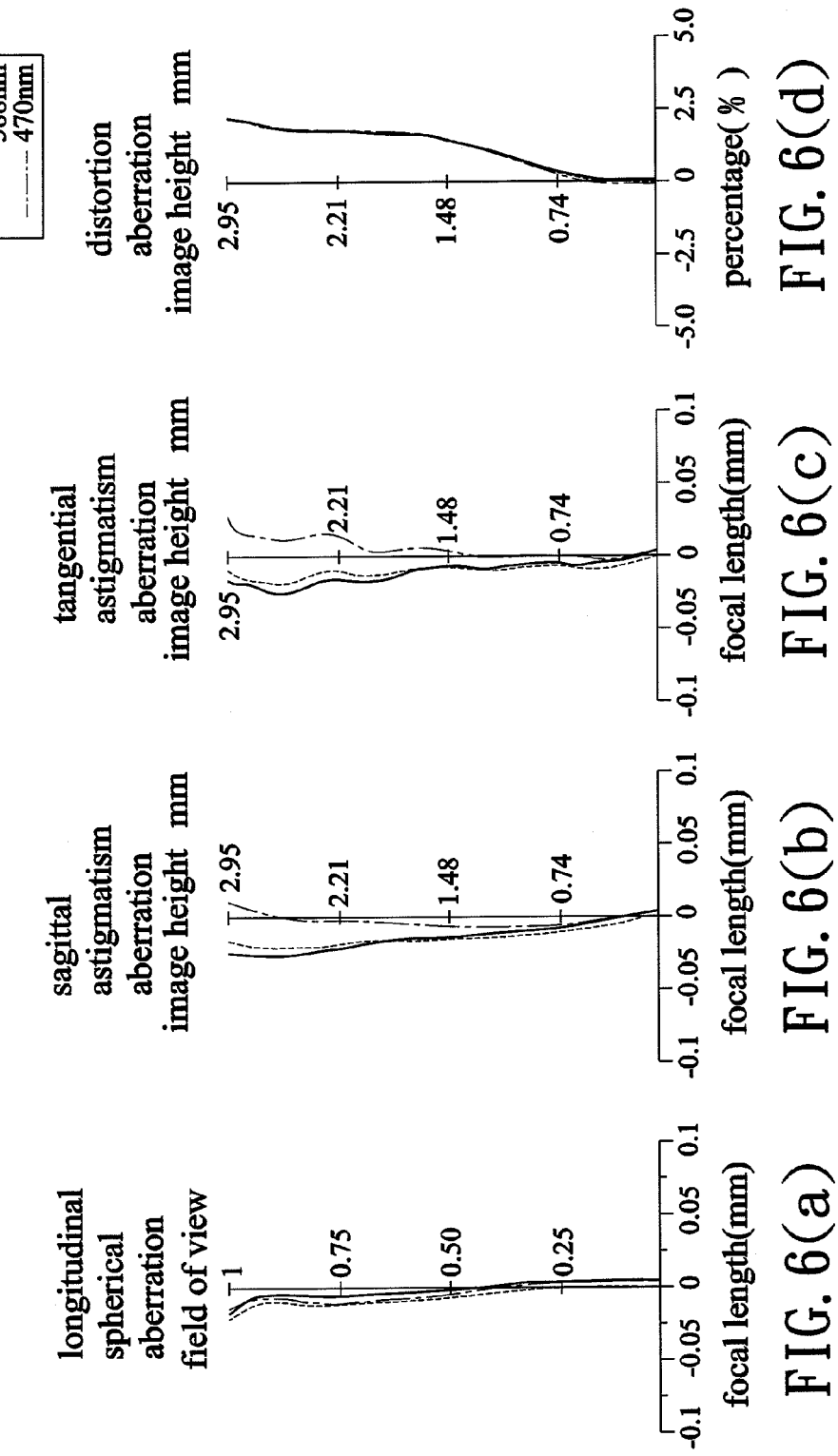
FIGS. 6(a) to 6(d) show different optical characteristics of the imaging lens of the first preferred embodiment.

It can be understood from FIG. 6(a) that, since each of the curves corresponding to longitudinal spherical aberration has a focal length at each field of view (indicated by the vertical axis) that falls within the range of ±0.025 mm, the first preferred embodiment is able to achieve a relatively low spherical aberration at each of the wavelengths. Furthermore, since a deviation in focal length among the curves at each field of view does not exceed the range of ±0.01 mm, the first preferred embodiment has a relatively low chromatic aberration.

It can be understood from FIGS. 6(b) and 6(c) that, since each of the curves falls within the range of ±0.025 mm of focal length, the first preferred embodiment has a relatively low optical aberration.

Moreover, as shown in FIG. 6(d), since each of the curves corresponding to distortion aberration falls within the range of ±2.5%, the first preferred embodiment is able to meet requirements in imaging quality of most optical systems.

In view of the above, with the system length reduced down to 4.81 mm, the imaging lens 10 of the first preferred embodiment is still able to achieve a relatively good optical performance.

Figure 7:
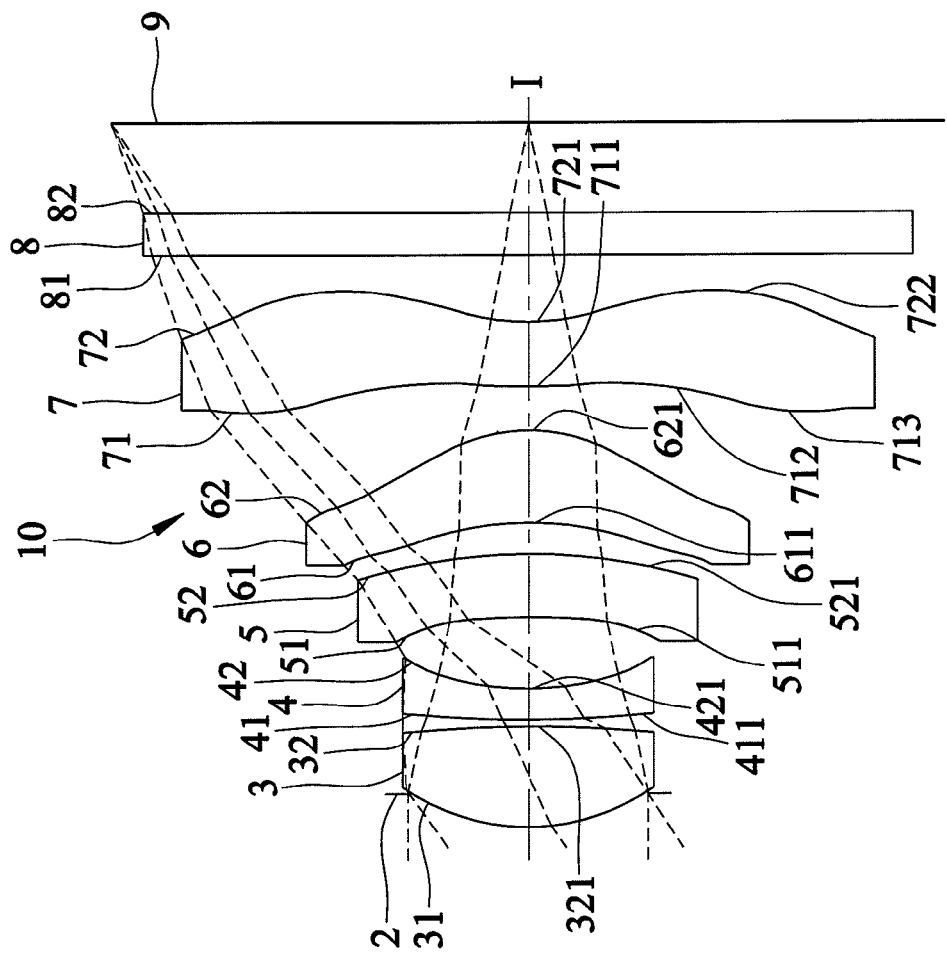
FIG. 7 is a schematic diagram that illustrates the second preferred embodiment of an imaging lens according to the present invention.
Figure 10:
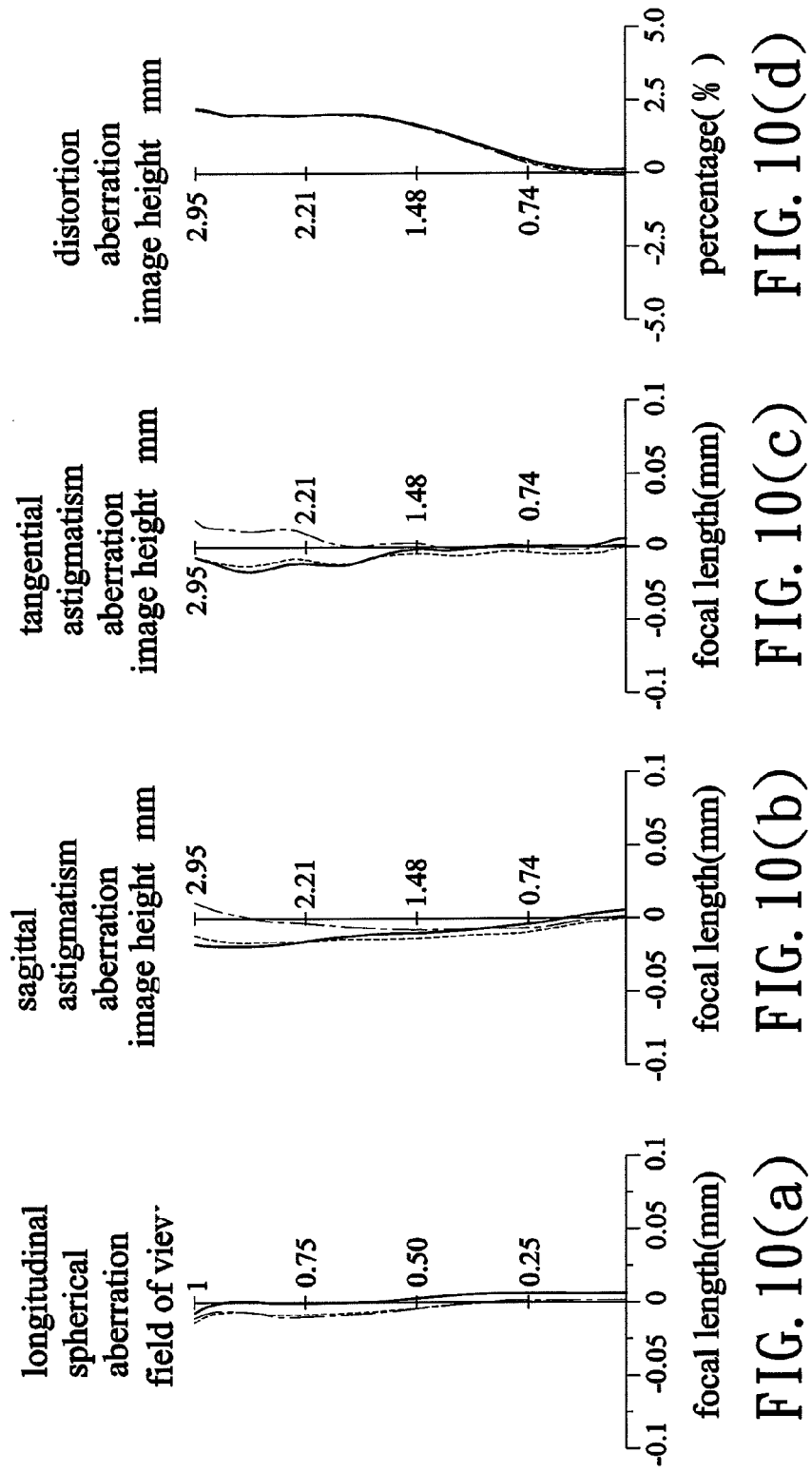
FIGS. 10(a) to 10(d) show different optical characteristics of the imaging lens of the second preferred embodiment.

Referring to FIG. 7, the difference between the first and second preferred embodiments resides in that, in the second preferred embodiment, the third lens element 5 has a negative refractive power.

Shown in FIG. 8 is a table that lists values of some optical parameters corresponding to the surfaces 31-81, 32-82 of the second preferred embodiment. In the second preferred embodiment, the imaging lens 10 has an EFL of 4.11 mm, a HFOV of 34.84°, an f-number of 2.40, and a system length of 4.91 mm.

FIG. 9 shows a table showing values of some parameters of optical relationship (1) corresponding to the second preferred embodiment. The imaging lens 10 of the second preferred embodiment satisfies:

$ALT/T4=3.82$;

$ALT/Gaa=2.28$;

$ALT/G45=7.99$;

$G34/G45=0.73$;

$T4/T5=1.43$;

$TTL/ALT=2.01$;

$TTL/Gaa=4.59$;

$G45/T2=1.39$;

$T4/G34=2.87$;

$Gaa/T5=2.40$; and $T4/T2=2.91$.

FIGS. 10(a) to 10(d) show simulation results corresponding to longitudinal spherical aberration, sagittal astigmatism aberration, tangential astigmatism aberration, and distortion aberration of the second preferred embodiment, respectively. It can be understood from FIGS. 10(a), 10(b), 10(c) and 10(d) that the second preferred embodiment is able to achieve a relatively good optical performance even with the system length reduced down to 4.91 mm.

Figure 11:
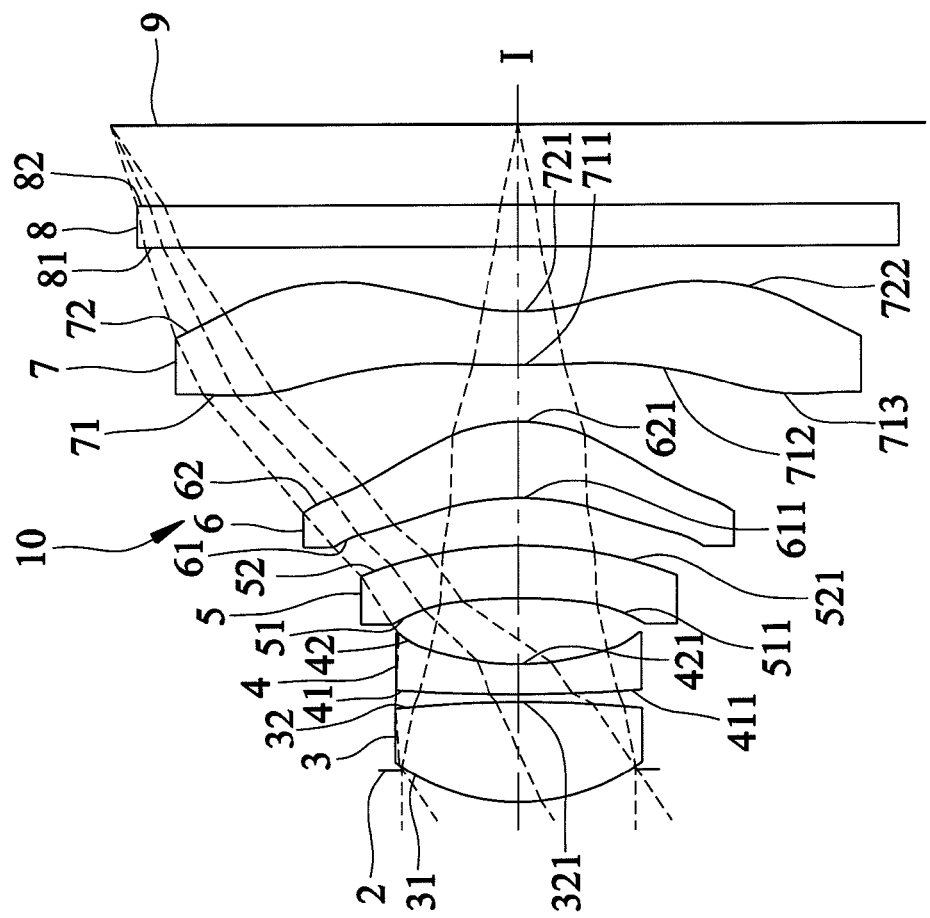
FIG. 11 is a schematic diagram that illustrates the third preferred embodiment of an imaging lens according to the present invention.
Figures 14A, 14B, 14C, 14D:
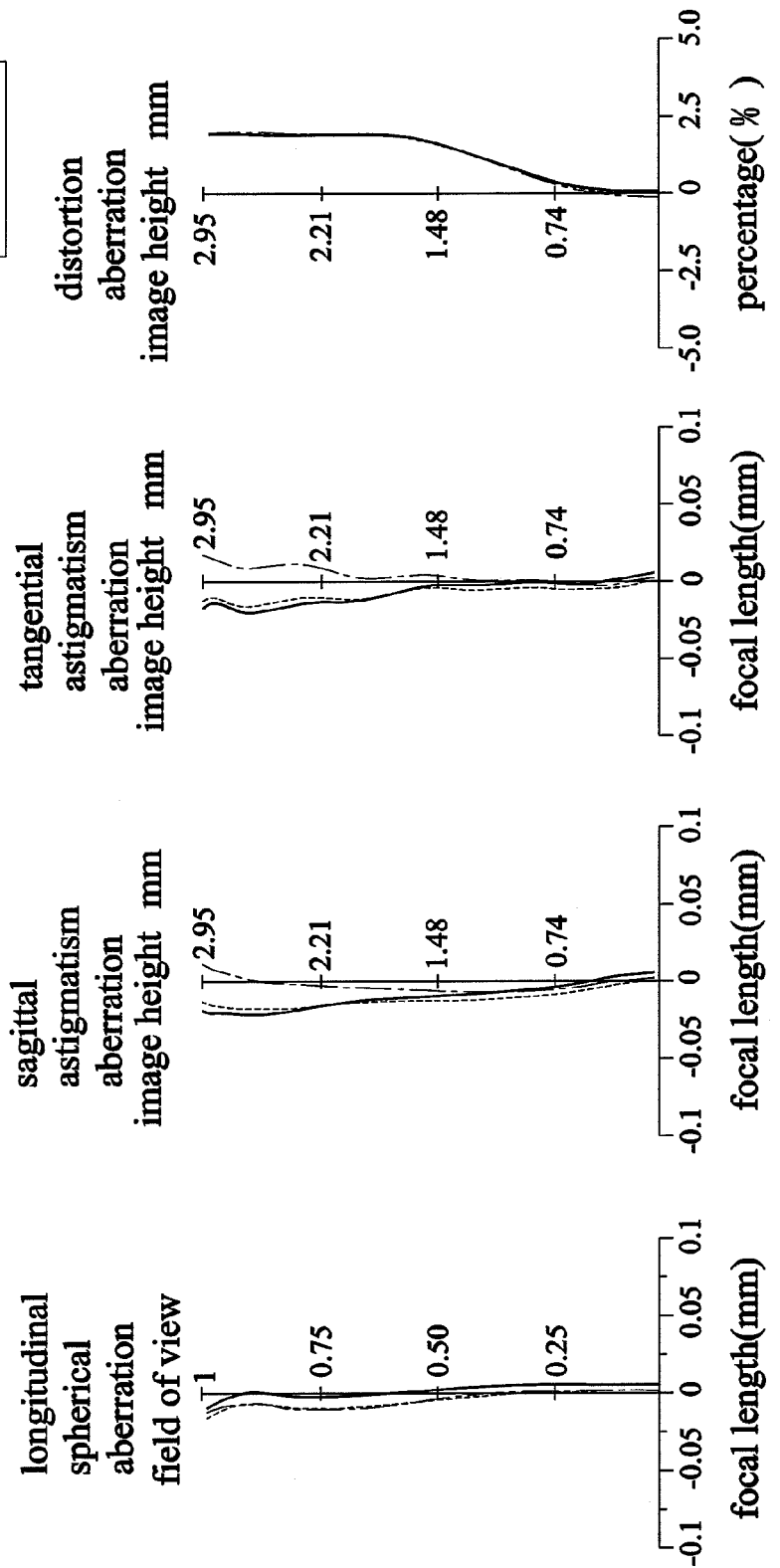
FIGS. 14(a) to 14(d) show different optical characteristics of the imaging lens of the third preferred embodiment.

Referring to FIG. 11, the difference between the first and third preferred embodiments resides in values of some optical parameters corresponding to the surfaces 31-81, 32-82 and in values of some parameters of optical relationship 1.

Shown in FIG. 12 is a table that lists values of some optical parameters corresponding to the surfaces 31-81, 32-82 of the third preferred embodiment. In the third preferred embodiment, the imaging lens 10 has an EFL of 4.12 mm, a HFOV of 34.87°, an f-number of 2.40, and a system length of 4.83 mm.

FIG. 13 shows a table showing values of some parameters of optical relationship 1 corresponding to the third preferred embodiment. The imaging lens 10 of the third preferred embodiment satisfies:

$ALT/T4=4.06$;

$ALT/Gaa=1.77$;

$ALT/G45=5.50$;

$G34/G45=0.82$;

$T4/T5=1.45$;

$TTL/ALT=2.16$;

$TTL/Gaa=3.84$;

$G45/T2=1.84$;

$T4/G34=1.65$;

$Gaa/T5=3.32$; and $T4/T2=2.50$.

FIGS. 14(a) to 14(d) show simulation results corresponding to longitudinal spherical aberration, sagittal astigmatism aberration, tangential astigmatism aberration, and distortion aberration of the third preferred embodiment, respectively. It can be understood from FIGS. 14(a), 14(b), 14(c) and 14(d) that the third preferred embodiment is able to achieve a relatively good optical performance even with the system length reduced down to 4.83 mm.

Figure 15:
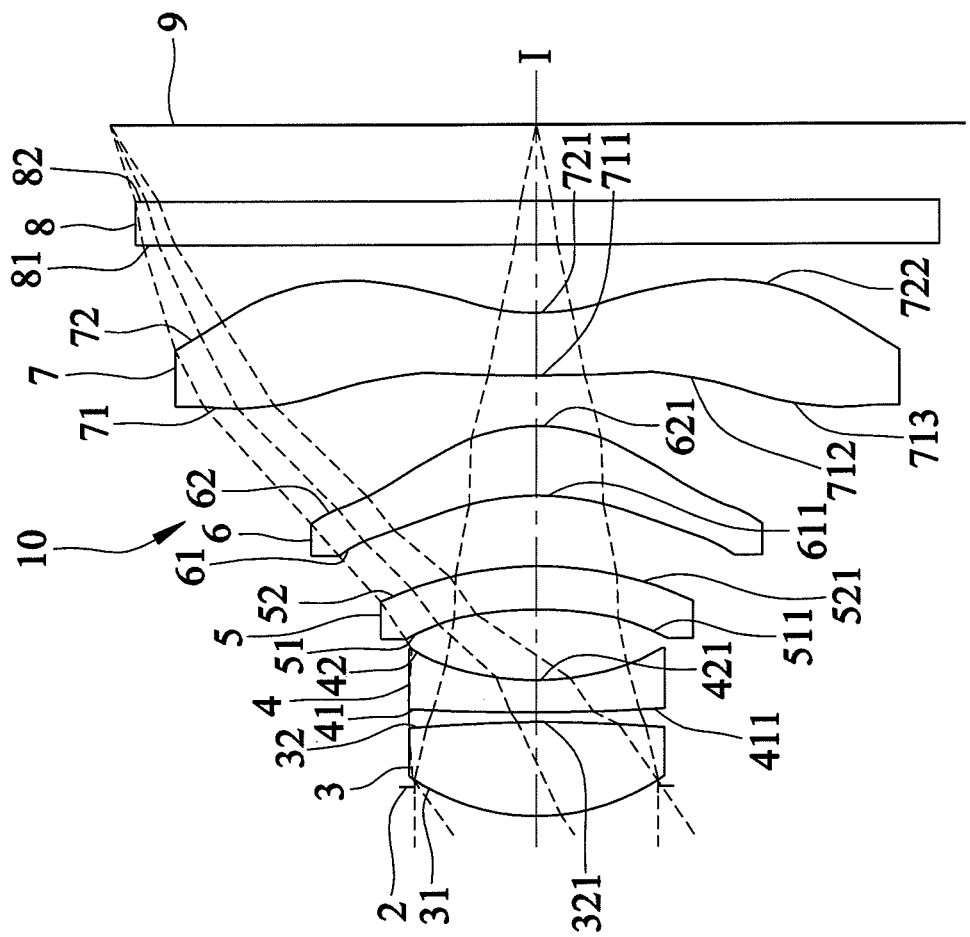
FIG. 15 is a schematic diagram that illustrates the fourth preferred embodiment of an imaging lens according to the present invention.
Figure 18:
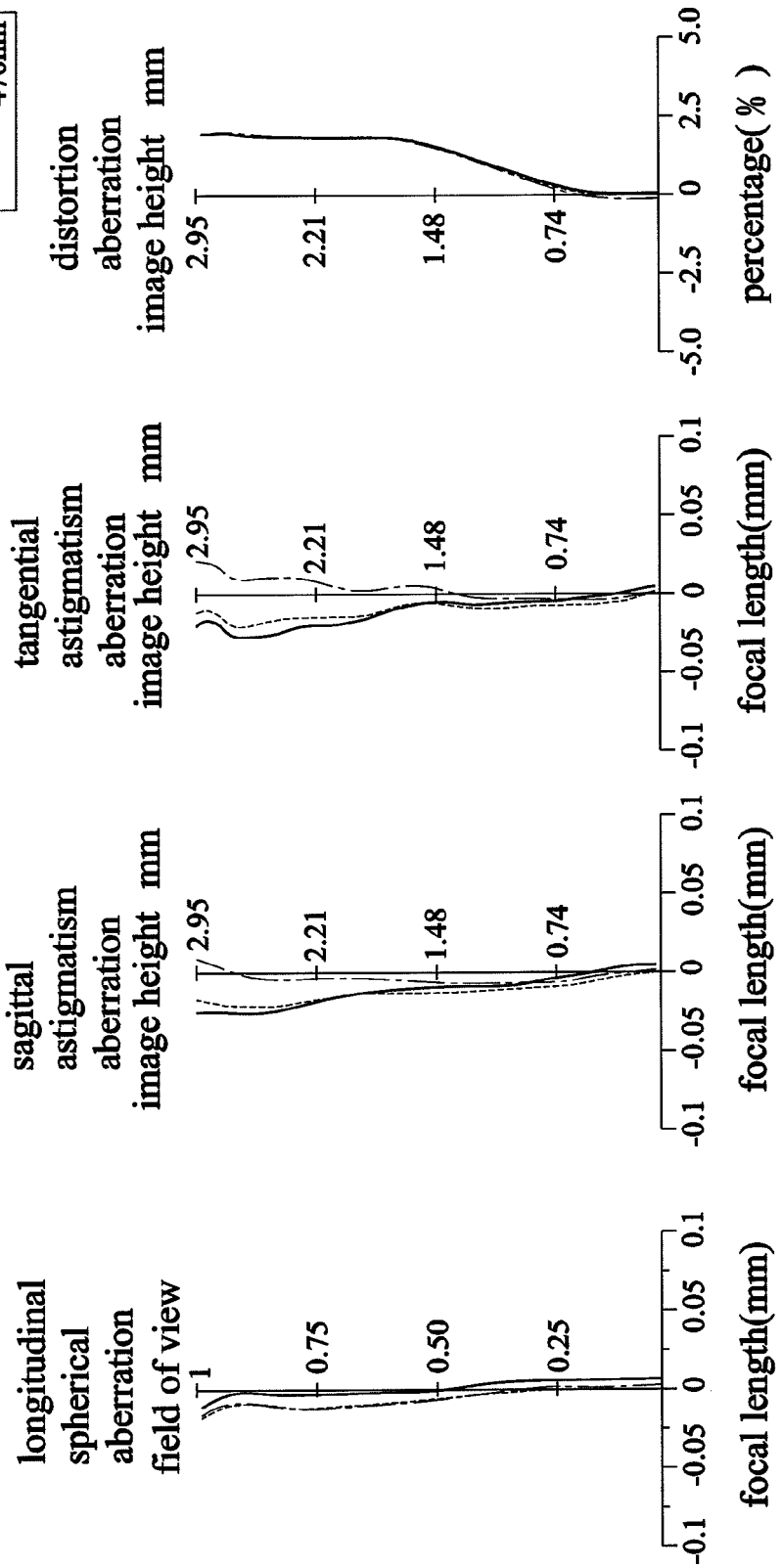
FIGS. 18(a) to 18(d) show different optical characteristics of the imaging lens of the fourth preferred embodiment.

Referring to FIG. 15, the difference between the first and fourth preferred embodiments resides in values of some optical parameters corresponding to the surfaces 31-81, 32-82 and in values of some parameters of optical relationship 1.

Shown in FIG. 16 is a table that lists values of some optical parameters corresponding to the surfaces 31-81, 32-82 of the fourth preferred embodiment. In the fourth preferred embodiment, the imaging lens 10 has an EFL of 4.12 mm, a HFOV of 34.88°, an f-number of 2.40, and a system length of 4.77 mm.

FIG. 17 shows a table showing values of some parameters of optical relationship 1 corresponding to the fourth preferred embodiment. The imaging lens 10 of the fourth preferred embodiment satisfies:

$ALT/T4=4.32$;

$ALT/Gaa=1.51$;

$ALT/G45=6.00$;

$G34/G45=1.39$;

$T4/T5=1.13$;

$TTL/ALT=2.28$;

$TTL/Gaa=3.45$;

$G45/T2=1.59$;

$T4/G34=1.00$;

$Gaa/T5=3.22$; and $T4/T2=2.20$.

FIGS. 18(a) to 18(d) show simulation results corresponding to longitudinal spherical aberration, sagittal astigmatism aberration, tangential astigmatism aberration, and distortion aberration of the fourth preferred embodiment, respectively. It can be understood from FIGS. 18(a), 18(b), 18(c) and 18(d) that the fourth preferred embodiment is able to achieve a relatively good optical performance even with the system length reduced down to 4.77 mm.

Figure 19:
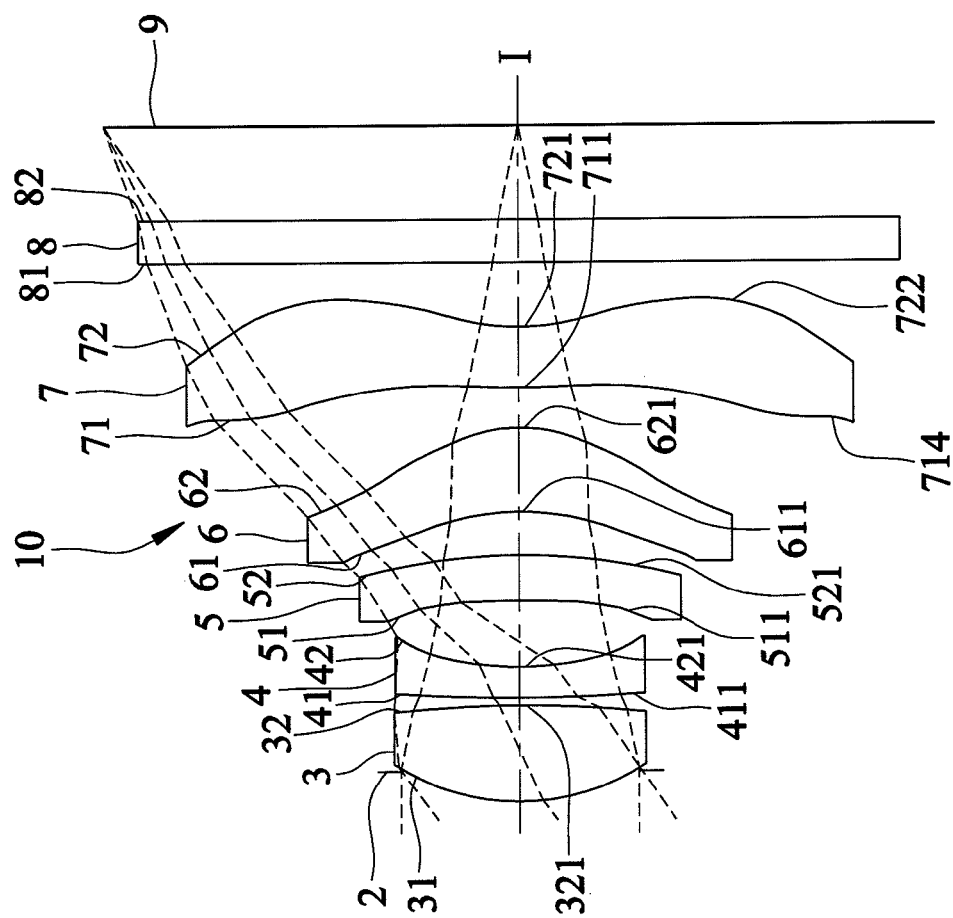
FIG. 19 is a schematic diagram that illustrates the fifth preferred embodiment of an imaging lens according to the present invention.
Figure 22:
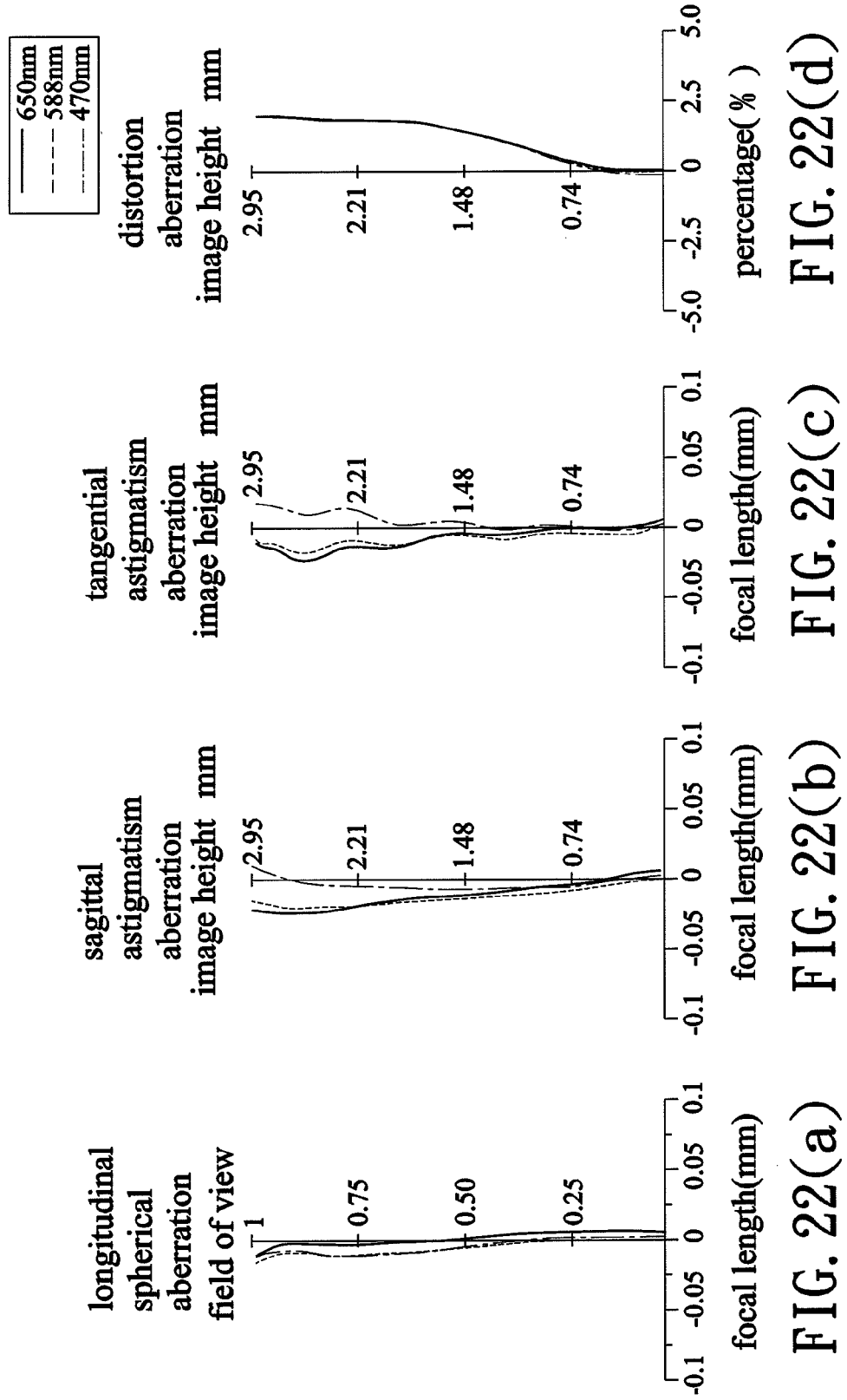
FIGS. 22(a) to 22(d) show different optical characteristics of the imaging lens of the fifth preferred embodiment.

Referring to FIG. 19, the difference between the first and fifth preferred embodiments resides in that, in the fifth preferred embodiment, the object-side surface 71 of the fifth lens element 7 has a convex portion 711 in a vicinity of the optical axis (I) and a concave portion 714 in a vicinity of the periphery of the fifth lens element 7.

Shown in FIG. 20 is a table that lists values of some optical parameters corresponding to the surfaces 31-81, 32-82 of the fifth preferred embodiment. In the fifth preferred embodiment, the imaging lens 10 has an EFL of 4.12 mm, a HFOV of 34.87°, an f-number of 2.40, and a system length of 4.82 mm.

FIG. 21 shows a table showing values of some optical parameters of optical relationship (1) corresponding to the fifth preferred embodiment. The imaging lens 10 of the fifth preferred embodiment satisfies:

$ALT/T4=3.80;$ $ALT/Gaa=2.05;$ $ALT/G45=7.99;$ $G34/G45=1.05;$ $T4/T5=1.37;$ $TTL/ALT=2.12;$ $TTL/Gaa=4.35;$ $G45/T2=1.29;$ $T4/G34=2.00;$ $Gaa/T5=2.55;$ and $T4/T2=2.75.$ FIGS. 22(a) to 22(d) show simulation results corresponding to longitudinal spherical aberration, sagittal astigmatism aberration, tangential astigmatism aberration, and distortion aberration of the fifth preferred embodiment, respectively. It can be understood from FIGS. 22(a), 22(b), 22(c) and 22(d) that the fifth preferred embodiment is able to achieve a relatively good optical performance even with the system length reduced down to 4.82 mm.

Shown in FIG. 23 is a table that lists some of the aforementioned optical relationships and the values thereof corresponding to each of the preferred embodiments for comparison.

When the imaging lens 10 satisfies optical relationships 2-12, the system length may be effectively reduced without significantly compromising the optical performance.

$G34/G45 \leq 1.50$ (2)

$ALT/G45 \leq 8.00$ (3)

$1.70 \leq T4/T2 \leq 3.00$ (4)

$T4/G34 \leq 2.10$ (5)

$G45/T2 > 0.90$ (6)

$ALT/Gaa \leq 2.05$ (7)

$T4/T5 \geq 1.10$ (8)

$TTL/Gaa < 4.60$ (9)

$Gaa/T5 \geq 2.10$ (10)

$TTL/ALT \geq 2.10$ (11)

$ALT/T4 < 4.50$ (12)

By virtue of the convex portion 521 of the image-side surface 52 of the third lens element 5, interference between the peripheries of the third and fourth lens elements 5, 6 is effectively reduced, such that the width of the clearance between the third and fourth lens elements 5, 6 (i.e., "G34") may be significantly reduced to satisfy the optical relationship (2). In addition to satisfying the optical relationship (2), the imaging lens 10 preferably further satisfies: G34/G45≥1.00 (or G34/G45≥0.50 in a less stringent configuration).

In the process of length reduction, a reduction in the sum of the thicknesses of the lens elements 3-7 is favorable for reduction in the system length. When the imaging lens 10 satisfies the optical relationship (3), the system length may be effectively reduced. In addition to satisfying the optical relationship (3), the imaging lens 10 preferably further satisfies ALT/G45≥5.00.

The second lens element 4 is generally a lens element with a relatively small optical effective radius and a negative refractive power, so as to allow a greater reduction in the thickness thereof. On the other hand, since the fourth lens element 6 is generally a lens element with a relatively large optical effective radius, the thickness of the fourth lens element 6 may be made greater. Therefore, when the imaging lens 10 satisfies the optical relationship (4), the thicknesses of the fourth and second lens elements 6, 4 may fall within an optimal range.

During the process of system length reduction, it is necessary to consider difficulty of manufacturing. When the imaging lens 10 satisfies the optical relationship (5), the thickness of the fourth lens element 6 and the width of the clearance between the third and fourth lens elements 5, 6 (i.e., "G34") fall within an optimal range, which effectively reduces difficulty of manufacturing. In addition to satisfying optical relationship (5), the imaging lens 10 preferably further satisfies T4/G34>0.83.

The second lens element 4 is generally a lens element with a relatively small optical effective radius and a negative refractive power, so as to allow a greater reduction in thickness thereof. The imaging lens 10 thus can satisfy the optical relationship (6), and more preferably further satisfies G45/T2≤2.03.

In the process of system length reduction, when the imaging lens 10 satisfies the optical relationship (7), the sum of the thicknesses of the lens elements 3-7 at the optical axis (I) (i.e., "ALT") and the sum of the widths of the clearances among the lens elements 3-7 at the optical axis (I) (i.e., "Gaa") fall within optimal ranges, which facilitates manufacturing of the imaging lens 10. In addition to satisfying the optical relationship (7), the imaging lens 10 preferably further satisfies ALT/Gaa≥2.30.

In practice, each of the fourth and fifth lens elements 6, 7 is generally a lens element with a relatively large optical effective radius. Hence, each of the fourth and fifth lens elements 6, 7 must have a certain thickness so as to facilitate manufacturing. When the imaging lens 10 satisfies the optical relationship (8), the thicknesses of the fourth and fifth lens elements 6,7 may be optimized. In addition to satisfying optical relationship (8), the imaging lens 10 preferably further satisfies T4/T5≤1.70.

While the distance between the object-side surface 31 of the first lens element 3 and the image plane 9 (i.e., "TTL") and the sum of the widths of the clearances among the lens elements 3-7 (i.e., "Gaa") may be reduced in the process of length reduction, a back focal length (BFL) of the imaging lens 10, which is a distance between the image-side surface 72 of the fifth lens element 7 and the image plane 9 at the optical axis (I), and the sum of the thicknesses of the lens elements 3-7 at the optical axis (I) (i.e., "ALT") may also be reduced such that the distance between the first lens element 3 and the image plane 9 (i.e., "TTL") is allowed to have greater reduction, so as to satisfy the optical relationship (9). In addition to satisfying optical relationship (9), the imaging lens 10 preferably further satisfies TTL/Gaa≥3.00.

When the imaging lens 10 satisfies the optical relationship (10), the sum of the widths of the clearances among the lens elements 3-7 at the optical axis (I) (i.e., "Gaa") and the thickness of the fifth lens element 7 at the optical axis (I) (i.e., "T5") may be optimized, thereby reducing the difficulty of manufacturing. In addition to satisfying the optical relationship (10), the imaging lens 10 preferably further satisfies Gaa/T5≤3.50.

When the imaging lens 10 satisfies the optical relationship (11), the distance between the first lens element 3 and the image plane 9 (i.e., "TTL") and the sum of the thicknesses of the lens elements 3-7 (i.e., "ALT") may be optimized, thereby reducing the difficulty of manufacturing. In addition to satisfying the optical relationship (11), the imaging lens 10 preferably further satisfies TTL/ALT≤2.50.

When the imaging lens 10 satisfies the optical relationship (12), the sum of the thicknesses of the lens elements 3-7 at the optical axis (I) (i.e., "ALT") and the thickness of the fourth lens element 6 at the optical axis (I) (i.e., "T4") may be optimized. In addition to satisfying the optical relationship (12), the imaging lens 10 preferably further satisfies ALT/T4≥3.50.

The imaging lens 10 of each of the preferred embodiment has several advantages compared to the prior art.

First, by virtue of the positive refractive power of the first lens element 3 and the convex portion 321 of the image-side surface 32 of the first lens element 3, the first lens element 3 has a relatively good converging capability and is therefore able to suppress effectively a chief ray angle at which an image-forming ray from the imaging lens 10 arrives at a marginal portion of the image plane 9, thereby improving quality of resultant images. Together with the aperture stop 2, the system length of the imaging lens 10 may be further reduced. Moreover, with the configuration in which the third lens element 5 has a positive refractive power, the positive refractive power of the first lens element 3 may be distributed, thereby reducing sensitivity of the imaging lens 10 to inaccuracy during manufacturing.

Second, by virtue of the negative refractive power of the second lens element 4, the convex portion 411 of the object-side surface 41, the concave portion 421 of the image-side surface 42, the concave portion 511 of the object-side surface 51, the convex portion 521 of the image-side surface 52, the concave portion 611 of the object-side surface 61, and the concave portion 621 of the image-side surface 62, the imaging lens 10 has a relatively low aberration.

Third, the configuration of the concave portion 721 and the convex portion 722 of the image-side surface of the fifth lens element 7 is favorable for correcting curvature and higher order aberrations of the imaging lens 10 and for suppressing chief ray angles of image-forming rays at the marginal portion of the image plane 9, which consequently improves sensitivity of an image sensor to be operatively associated with the imaging lens 10. Together with the convex portion 711 of the object-side surface 71 of the fifth lens element 7, the system length of the imaging lens 10 may be further reduced.

Fourth, through configuring the imaging lens 10 such that it satisfies the optical relationships (2)-(12), the imaging lens 10 is able to effectively reduce aberrations (e.g., spherical aberration). Together with the arrangement of the lens elements 3-7 and the design of the surfaces thereof 31-71, 32-72, the system length of the imaging lens 10 may be reduced without significantly compromising the optical performance.

Fifth, since the system length of the imaging lens 10 of each of the preferred embodiments is below 5 mm, the imaging lens 10 is suitable for use in electronic devices with smaller dimensions.

Figure 24:
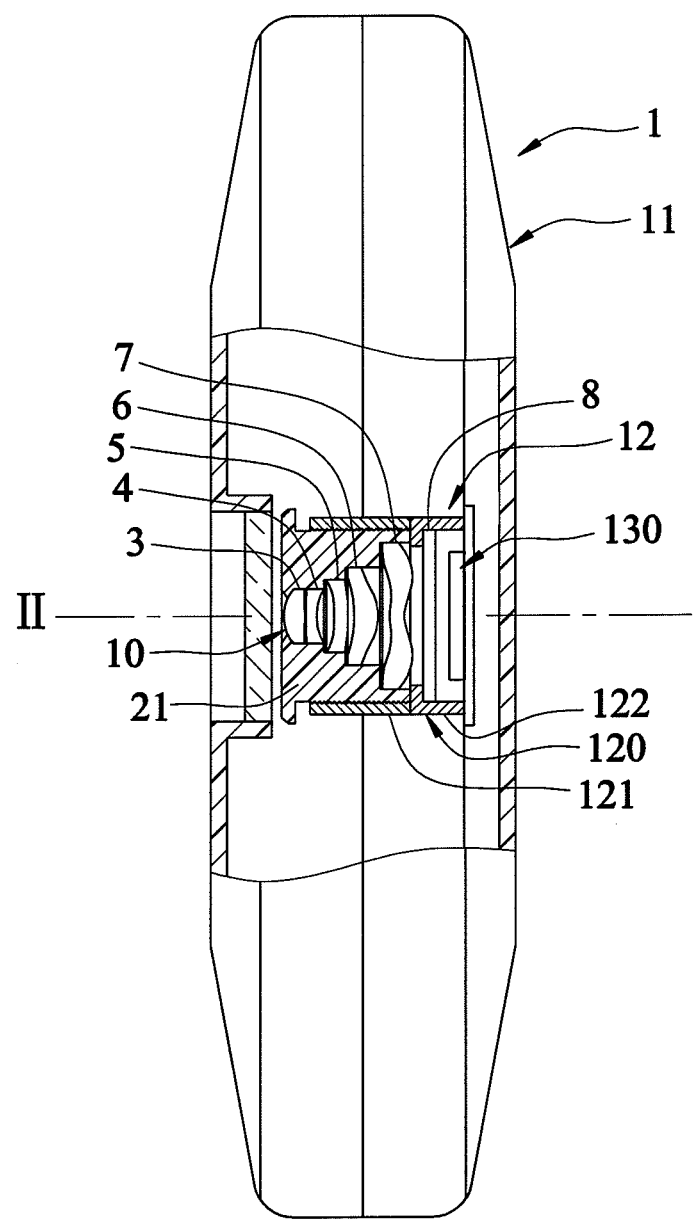
FIG. 24 is a schematic partly sectional view to illustrate a first exemplary application of the imaging lens of the present invention.

Shown in FIG. 24 is a first exemplary application of the imaging lens 10 of the present invention, in which the imaging lens 10 is disposed in a housing 11 of an electronic device 1 (such as a mobile phone), and forms a part of an image module 12 of the electronic device 1.

The image module 12 includes a barrel 21 whereat the imaging lens 10 is disposed, a seat unit 120 on which the barrel 21 is disposed, and an image sensor 130 disposed at the image side with respect to the imaging lens 10, more particularly at the image plane 9. The image sensor 130 is operatively associated with the imaging lens 10 for capturing images.

The seat unit 120 includes a barrel-holding module 121 that is disposed coaxially together with the barrel 21 along an axial line (II), and a sensor-holding module 122 that is disposed between the barrel-holding module 121 and the image sensor 130. The barrel 21 is disposed substantially in the barrel-holding module 121.

Figure 25:
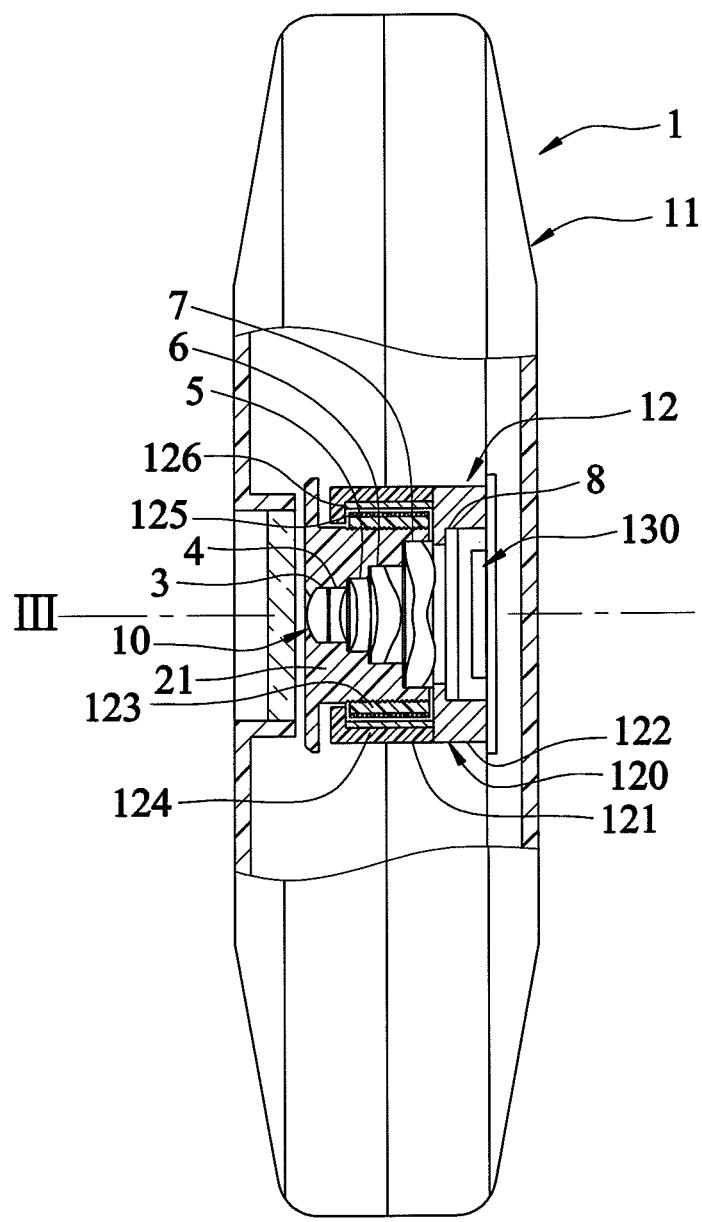
FIG. 25 is a schematic partly sectional view to illustrate a second exemplary application of the imaging lens of the present invention.

Shown in FIG. 25 is a second exemplary application of the imaging lens 10 of the present invention. The difference between the first and second exemplary applications resides in that, in the second exemplary application, the seat unit 120 is implemented in the form of a voice-coil motor (VCM), and the barrel-holding module 121 includes first and second holder portions 123, 124, a coil 125, and a magnetic component 126. The first holder portion 123 abuts against an outer surface of the barrel 21, and is disposed together with the barrel 21 along an axial line (III). The second holder portion 124 surrounds substantially the first holder portion 123 and is disposed along the axial line (III). The coil 125 is disposed between the first holder portion 123 and the second holder portion 124. The magnetic component 126 is disposed between the coil 125 and the second holder portion 124.

The first holder portion 123 of the barrel-holding module 121 is movable together with the barrel 21 and the imaging lens 10 therein along the axial line (III). The sensor-holding module 122 abuts against the second holder portion 124. The optical filter 8 is disposed at the sensor-holding module 122. Configuration and arrangement of other components of the electronic device 1 in the second exemplary application are identical to those in the first exemplary application, and hence will not be described hereinafter for the sake of brevity.

In summary, with the system length of the imaging lens 10 reduced to below 5 mm without compromising optical performance, the imaging lens 10 of the present invention is suitable for use in various electronic devices with relatively small dimensions, such as those exemplified in the above exemplary applications. Since dimensions of the electronic devices are reduced, the amount of material and hence cost required for manufacturing the electronic devices are also reduced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element, a fourth lens element, and a fifth lens element arranged along an optical axis from an object side to an image side in the given order, each of said first, second, third, fourth and fifth lens elements having an object-side surface facing toward the object side and an image-side surface facing toward the image side, wherein:

said first lens element has a positive refractive power, said image-side surface of said first lens element having a convex portion in a vicinity of the optical axis;

said second lens element has a negative refractive power, said object-side surface of said second lens element having a convex portion in a vicinity of a periphery of said second lens element, said image-side surface of said second lens element having a concave portion in a vicinity of the optical axis;

said object-side surface of said third lens element has a concave portion in a vicinity of a periphery of said third lens element, said image-side surface of said third lens element having a convex portion in a vicinity of the periphery of said third lens element;

said object-side surface of said fourth lens element has a concave portion in a vicinity of the optical axis, said image-side surface of said fourth lens element having a convex portion in a vicinity of the optical axis;

said object-side surface of said fifth lens element has a convex portion in a vicinity of the optical axis, said image-side surface of said fifth lens element having a concave portion in a vicinity of the optical axis and a convex portion in a vicinity of a periphery of said fifth lens element;

said imaging lens does not include any lens element with refractive power other than said first, second, third, fourth, and fifth lens elements; and said imaging lens satisfies G45/T2>0.90, where "G45" represents a width of a clearance between said fourth and fifth lens elements at the optical axis; and "T2" represents a distance between said object-side surface and said image-side surface of said second lens element at the optical axis.

2. An electronic device comprising:
a housing; and
an image module disposed in said housing, and including said imaging lens as claimed in claim 1, a barrel whereat said imaging lens is disposed, a seat unit on which said barrel is disposed, and an image sensor disposed at the image side with respect to said imaging lens.

3. The electronic device as claimed in claim 2, wherein said seat unit includes a barrel-holding module including first and second holder portions, said first holder portion abutting against an outer surface of said barrel and being disposed together with said barrel along an axial line, said second holder portion surrounding said first holder portion and being disposed along the axial line, said first holder portion being movable together with said barrel and said imaging lens along the axial line.

4. The electronic device as claimed in claim 3, wherein said seat unit further includes a sensor-holding module disposed between said second holder portion and said image sensor, and abutting against said second holder portion.

5. The imaging lens as claimed in claim 1, satisfying TTL/Gaa<4.60, wherein:
"TTL" represents a distance at the optical axis between said object-side surface of said first lens element and an image plane formed by said imaging lens at the image side; and
"Gaa" represents a sum of widths of a clearance between said first and second lens elements at the optical axis, a clearance between said second and third lens elements at the optical axis, a clearance between said third and fourth lens elements at the optical axis, and a clearance between said fourth and fifth lens elements at the optical axis.

6. The imaging lens as claimed in claim 5, further satisfying Gaa/T5≤2.10, wherein "T5" represents a distance between said object-side surface and said image-side surface of said fifth lens element at the optical axis.

7. The imaging lens as claimed in claim 6, further satisfying TTL/ALT>2.10, where "ALT" represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and the distance between said object-side surface and said image-side surface of said fifth lens element at the optical axis.

8. The imaging lens as claimed in claim 1, wherein said third lens element has a positive refractive power.

9. The imaging lens as claimed in claim 8, further satisfying ALT/Gaa≤2.05, where:
"ALT" represents a sum of a distance between said object-side surface and said image-side surface of said first lens element at the optical axis, the distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis; and
"Gaa" represents a sum of widths of a clearance between said first and second lens elements at the optical axis, a clearance between said second and third lens elements at the optical axis, a clearance between said third and fourth lens elements at the optical axis, and the clearance between said fourth and fifth lens elements at the optical axis.

10. The imaging lens as claimed in claim 9, further satisfying T4/T5>1.10, wherein
"T4" represents the distance between said object-side surface and said image-side surface of said fourth lens element at the optical axis; and
"T5" represents the distance between said object-side surface and said image-side surface of said fifth lens element at the optical axis.

11. The imaging lens as claimed in claim 1, satisfying G34/G45≤1.50, where:
"G34" represents a width of a clearance between said third and fourth lens elements at the optical axis.

12. The imaging lens as claimed in claim 11, further satisfying TTL/Gaa≤4.60, where:
"TTL" represents a distance at the optical axis between said object-side surface of said first lens element and an image plane formed by said imaging lens at the image side; and
"Gaa" represents a sum of widths of a clearance between said first and second lens elements at the optical axis, a clearance between said second and third lens elements at the optical axis, the clearance between said third and fourth lens elements at the optical axis, and the clearance between said fourth and fifth lens elements at the optical axis.

13. The imaging lens as claimed in claim 12, further satisfying ALT/T4<4.50, where:
"ALT" represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis; and "T4" represents the distance between said object-side surface and said image-side surface of said fourth lens element at the optical axis.

14. The imaging lens as claimed in claim 13, further satisfying $1.00 \leq G34/G45 \leq 1.50$.

15. The imaging lens as claimed in claim 11, further satisfying $ALT/G45 < 8.00$, where "ALT" represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis.

16. The imaging lens as claimed in claim 15, further satisfying $1.70 \leq T4/T2 \leq 3.00$, where "T4" represents the distance between said object-side surface and said image-side surface of said fourth lens element at the optical axis.

17. The imaging lens as claimed in claim 16, further satisfying $T4/G34 \leq 2.10$.

* * * * *